Patented Jan. 3, 1939

2,142,088

UNITED STATES PATENT OFFICE 2,142,088

EDIBLE AND METHOD OF MAKING

Louis W. Anderson, Toledo, Ohio

No Drawing. Application March 16, 1936,
Serial No. 69,133

6 Claims. (Cl. 99—134)

My invention relates to the art of making an edible and to ingredients for use in conjunction with an edible. The invention is particularly adaptable to use in the making of confectionary or household edibles and has for one of its objects to provide a flavoring and coloring compound or material and to teach a method of flavoring and coloring confections and the like.

My invention has for another object to provide an edible, the bulk body or base portion of which contains and supports in physical suspension therein particles of a flavored, or colored, or flavored and colored edible to thereby impart the same to the said base portion. Another object of the invention is to provide an edible substance, the flavoring of which is effected by a solution resulting from a commingling of suspended soluble particles and the contained moisture of the base portion of the edible. The solution thus formed is not only definitely characterized, as to taste, by the flavor of the particles, but also has undertones or suggestions of taste of the combined ingredients of the base portion of the edible. The distribution of the flavor in the edible is effected along the lines of moisture content and passage in the base portion to produce areas of graduated flavoring intensity. Most flavors have a characteristic color which readily designates the flavor of the article. Thus, the resultant taste of the edible is unique and distinctive in its modulated acuteness of flavor reaction to consumer of the edible. An aesthetic and appealing mosaic appearance in the edible may be obtained, especially where the base portion of the edible is different in color from the flavoring particles. Thus, a mixture of particles of several different flavors and colors may be used in the base portion to give a pleasing flavor with gaudy and contrasting color through the base portion.

The invention has for a further object to provide an edible having a viscous base portion containing moisture and as a substantially inert and suspended ingredient, soluble particles of an edible from which substantially all the moisture has been removed. The soluble particles have considerable affinity to moisture and tend to attract and hold the relatively large quantities of the same within the body of the edible, thus assuring maintenance of proper moisture content thereof, contributing to the lasting edibility of the body over a period of time and the general tastiness thereof. This feature is of material advantage where the base portion of the edible is of a multi-cellular consistency as such edibles lose their moisture to the atmosphere and take on an untasty rubbery characteristic.

A further object of the invention is to provide an edible substance, the base portion of which is formed of ingredients mixed and combined at a temperature whereby on cooling thereof, the base portion becomes somewhat stiff, enabling formation of the substance into desired shapes and having intermixed, but not combined therewith, hardened particles of an edible formed from ingredients mixed and combined at temperatures higher than the mixing temperature of the base portion. The particles, by reason of the higher temperatures at which the ingredients thereof are mixed and combined, are more resistant to disintegration or breakdown caused by atmospheric temperatures to which the edible may be exposed. Thus, the particles act to maintain the base portion in a contiguous mass of a desired shape at atmospheric temperatures which might ordinarily cause the formed base portion to lose shape and character.

A further object of the invention is to teach a method by which an edible may be formed that is tastily flavored and aesthetically colored, resistant to high atmospheric temperatures, and of lasting quality and moisture content. The method involves the steps by means of which the particles are placed in the base portion, so that the particles do not lose their identity, either as to taste, color, or physical characteristics, to enable the performance of their function when needed.

My invention has for a particular object to provide a method whereby an edible having a base portion containing gelatinous or albuminous material may be colored and flavored with a flavor having an acid reaction. Another particular object of the invention is to provide a means whereby such acidic flavors having characteristic colors may be mixed with a gelatinous or albuminous containing base portion. Thus, the invention enables the flavoring of marshmallow, meringue and like edibles with an acid tasting fruit flavor without destroying the aerated or cellular structure of the marshmallow or meringue.

The invention consists in other features and advantages which will appear from the following description. Compositions containing the invention may partake of different forms and may be varied in their details and still embody the invention. To illustrate a practical application of the invention I have selected an edible embodying the invention as an example of the various compositions and details thereof that contain the invention. I have also set forth a method which is taught by my invention and is within the spirit thereof. The particular edible and method selected is described hereinafter.

The phrase "base portion", as hereinafter used in this specification and the claims appended hereto, is limited to any one or a mixture of any two or more of the following edibles or their equivalents: marshmallow, meringue, custard, jelly and/or fondant.

I have selected an edible which has a marshmallow base portion as an illustration of one of the forms of my invention. The marshmallow base portion may be concocted according to any of a variety of recipes. The ingredients usually consist in proper proportions of water, sugar, gelatin, and a "doctor", such as corn syrup. I have used and found satisfactory for producing a marshmallow base portion a combination of about 30 pounds of water, 50 pounds corn syrup, 50 pounds of sugar, and two pounds of gelatin. The ingredients may be heated to a temperature and cooked for a period sufficient to effect combination thereof. I prefer to mix the sugar, corn syrup, and water together and cook the resulting mixture to a temperature of 240° F. When the mixture has been thus cooked and before cooling, I find it desirable to add and stir into the mixture the gelatin ingredient. After such combination, the mixture is subjected to a strenuous beating. I find it desirable to cool the mixture to about 200° F. and then subject it to a mechanical beating until quite stiff. Thereafter my flavoring and coloring material is introduced into the mixture.

The flavoring and coloring material may be formed by combining water and sugar ingredients in proper proportions and a corn syrup "doctor". I prefer and suggest that to 65 pounds of sugar be added enough water to thoroughly dissolve the same. To this solution, I add about 35 pounds of corn syrup. The mixture is then cooked to a temperature of between 275° and 325° F. during which substantially all the moisture is removed. Upon completion of the combination, the resulting mixture may be poured onto a cooling table where it may be worked and pulled. During the working and pulling, a flavor, such as a lemon flavor, may be added. The lemon flavor has a characteristic yellow color which is imparted to the material. The color may be further enhanced by the addition of a standard coloring material. I use, in a mixture of the above quantities, about one ounce of flavor of the normal concentration. Quantities of citric acid, which reinforces and emphasizes the fruitiness of the flavor, may be added at this time. To the lemon flavored and colored mixture referred to above, I add about one ounce of citric acid. The working and pulling is continued over an extended period of time whereby the material is quite substantially aerated and therefore lightened, so that when the material is ultimately placed in the base portion, it will be more readily sustained in physical suspension thereby. Upon completion of the working and pulling, the mass cools and assumes a hard, somewhat crystalline structure. The structure is then crushed to an extent sufficient to form particles varying in size from a fine pulverant powder to that size which will pass through ⅜ inch mesh. If desired, the particles may be graded to enable use of particle size according to some plan or requirement of flavor or color decoration. The particles thus formed are, by reason of their low moisture content, readily absorptive thereof and by reason of the higher temperatures at which the ingredients thereof are combined are more resistant to thermally induced disintegration than the base portion.

The above recited quantities of each ingredient combined to form either the base portion or coloring and flavoring particle material; the combining temperatures of said ingredients; the above stated sizing of the particles may be varied in accordance with variations in taste, color, form, and consistency of the desired resultant edible and the packaging of the same.

The particle material may be then, as stated hereinbefore, added to the marshmallow base portion. I have found where the base portion is to be cast in forms of unit confections or pieces that if approximately 25 to 30 pounds of particle material of mixed size or grade are added to each 100 pounds of base portion, good results in color and flavor may be obtained. If the mershmallow base portion is to be used as a spread on cakes and the like, I have found that the best results are obtained by adding increased quantities of the material. My experience has shown that 35 pounds of particle material of mixed size added to 100 pounds of marshmallow base portion produces a spread of good taste, color, lasting quality, and workability.

The particle material in quantities as above suggested is added to the beaten base portion by mixing in the material sufficiently to insure thorough distribution without extended movement of the particles through the base portion so as to cause any substantial dissolution of the particles or reaction between the particles and the base portion. Preferably the stirring in of the particle material is effected while the base portion is below its cooking temperature, but above a temperature of its greatest viscosity and at a temperature where the stirring of the particle material into the base portion will not destroy the physical consistency of the base portion, but will permit a balanced distribution of the material throughout the base portion and without marked thermal attack on the particles.

After the particle material has been added to the marshmallow base portion, the resulting edible may be poured out to further cool. If it is desired to form individual piece or package units for convenient packaging and consumption, the base portion is poured into molds or containers. Almost immediately on cooling of the base portion, the particles, by reason of their moisture absorptive capacity, tend to draw toward themselves the moisture content of the base portion, as well as the moisture condensed within the base portions on cooling thereof. The moisture acts to gradually dissolve the particles and form a flavor and color containing and conveying solution.

The colored and flavored solution tends to permeate through the body of the base portion, transmitting its color and flavor to various parts of the base portion. Especially marked and distinguishable distribution is effected along lines or passageways in the base portion through which moisture may readily move. Thus, the flavor and color distributes through the base portion to form areas of varying and increased flavor and color characteristic and content which contributes to the improved tastiness and aesthetic appearance.

Ultimately, a sheath of jelly-like adhesive substance resulting from combination of the moisture in proximity to the particles with an excess quantity of the particles may be formed about the particles. Within the sheath, a core of the particle may remain undissolved. The particles and their jelly sheaths, being in an unsaturated condition, continue to attract moisture, controlling and resisting the withdrawal of moisture from the base portion by the atmosphere to which the base portion may be exposed.

By practicing my method of making an edible, an acid flavor may be added to an aerated base portion containing gelatin or albuminous ingredients. Ordinarily the addition of acids to a base portion containing such ingredients causes breakdown of the cells of the aerated body. Consequently, I add the acid flavor indirectly and through the medium of the particle material, so that the acidic reaction with gelatin or albuminous ingredients is limited and confined to the surface of the particle. The extent of this reaction does not materially effect the base portion as an entirety. In mixing the particles into said base portion, care is exercised to limit the extent of mixing, so that actual movement of the particles through the base portion is confined to that necessary to effect mere distribution. Thus, the reaction of the acid ingredient of the particle with the base portion is localized, and the extent of dissolution of the particle during mixing is small. I, therefore, am able to impart a distinct acid flavor to base portions having ingredients which make possible the development of an aerated or multicellular consistency and the production of frothy, fruit flavored confection.

In accordance with the provisions and statutes, I have described one of the best forms of my invention and method of practicing the same now known to me. However, those skilled in the art will readily understand that many changes may be made without departing from the spirit of my invention, as set forth in the appended claims.

I claim:

1. An edible marshmallow having an edible base portion normally containing but substantially unretentive of moisture and edible sugar particles substantially inert to the ingredients of the base portion suspended in said base portion and normally containing little but readily absorptive of moisture, said particles tending to attract moisture and reservoir the same within the base portion.

2. An edible adapted to be exposed to normal atmospheric conditions for an undeterminable period of time before consumption thereof and having under said normal atmospheric conditions a stiff viscous base portion of the character described herein and a flavoring material therefor, the flavoring material comprising particles of a flavored sugar crystalloid body of low moisture content, said particles being dispersed through the base portion, the particles tending to attract moisture by reason of the said low moisture content thereof and hold the same when the edible is exposed to said normal atmospheric conditions, the moisture thus attracted and held conveying the flavor from the particles to the base portion and maintaining the edible moist and palatable for long periods of time notwithstanding exposure of the edible to said normal atmospheric conditions for said undeterminable period of time.

3. An edible adapted to be exposed to normal atmospheric conditions for an undeterminable period of time before consumption thereof and having under said normal atmospheric conditions a stiff viscous base portion of the character described herein and a coloring material therefor, the coloring material comprising particles of a colored sugar crystalloid body of low moisture content, said particles being dispersed through the base portion, the particles tending to attract moisture by reason of the said low moisture content thereof and hold the same when the edible is exposed to said normal atmospheric conditions, the moisture thus attracted and held conveying the color from the particles to the base portion and maintaining the edible moist and palatable for long periods of time notwithstanding exposure of the edible to said normal atmospheric conditions for said undeterminable period of time.

4. An edible characterized by the fact that it remains moist over a long period of time despite exposure thereof to normal atmospheric conditions during said period and comprising a stiff viscous base portion normally containing moisture and particles of a dehydrated, water-soluble sugar crystalloid body haphazardly disposed in spaced relation through the base portion, the particles being readily absorptive of moisture and tending to attract and reservoir the same in the base portion.

5. An edible characterized by the fact that it remains moist over a long period of time despite exposure thereof to normal atmospheric conditions during said period and comprising a stiff viscous base portion normally containing moisture and particles of a flavored and colored, dehydrated, water-soluble sugar crystalloid body haphazardly disposed in spaced relation through the base portion, the particles being readily absorptive of moisture and tending to attract and reservoir the same in the base portion by means of which the flavor and color of the particles is conveyed to the base portion.

6. The method of making an edible having a base portion which is stiff and viscous at normal atmospheric conditions and normally contains but is unretentive of moisture when exposed to said normal atmospheric conditions for an extended period of time whereby moisture is caused to remain within said base portion during said extended period of time notwithstanding exposure to said normal atmospheric conditions during said period which includes disposing a water-soluble, substantially dehydrated sugar crystalloid particle within the base portion while the same is less stiff and viscous than at normal atmospheric conditions, the disposing movement of the particles through the base portion being sufficient to allocate the particle therein and insufficient to effect complete dissolution of the particle.

LOUIS W. ANDERSON.